Nov. 10, 1931.         A. P. GREEN              1,830,833
                        LAWN SPRINKLER
                     Filed Feb. 4, 1929        2 Sheets-Sheet 1
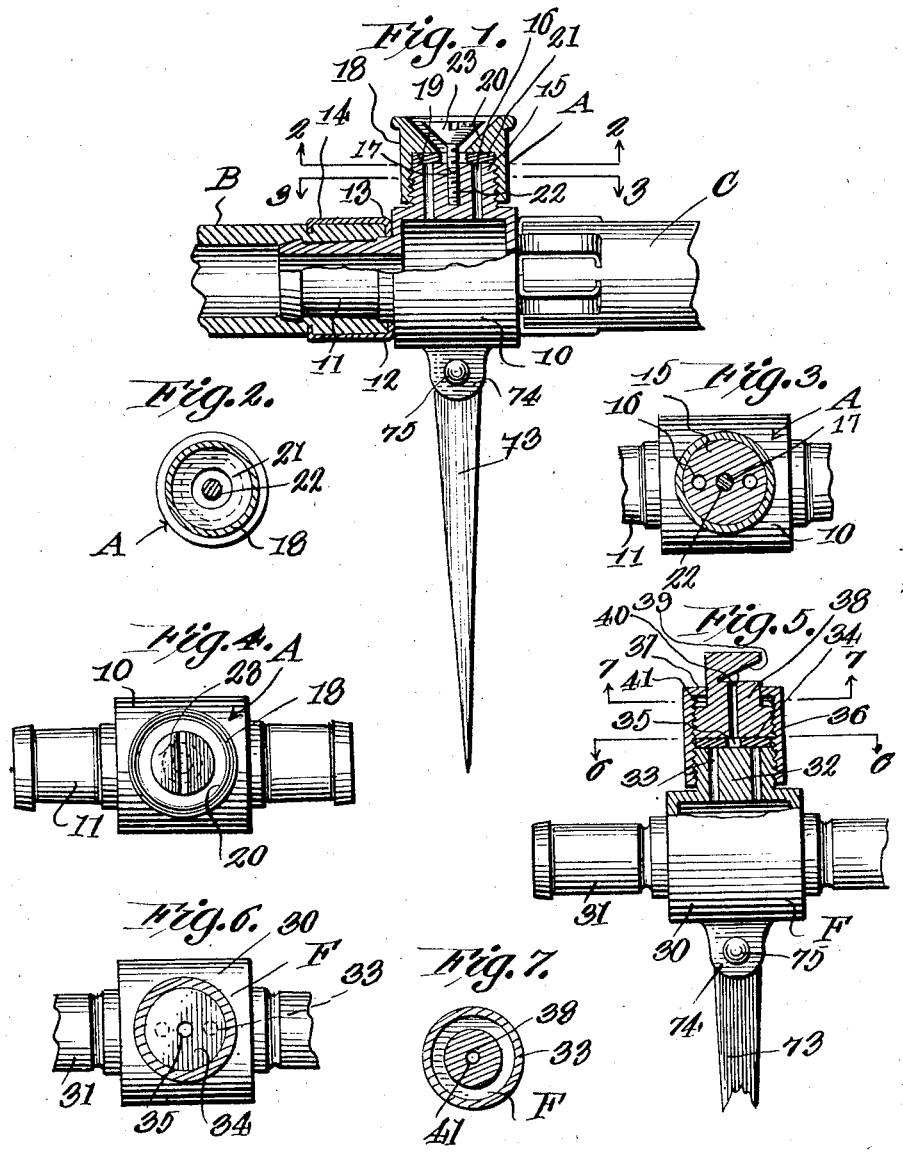
WITNESS                                    INVENTOR.
                                        ARLINGTON P. GREEN
                                              BY
                                                   ATTORNEYS.

Nov. 10, 1931.  A. P. GREEN  1,830,833
LAWN SPRINKLER
Filed Feb. 4, 1929  2 Sheets-Sheet 2
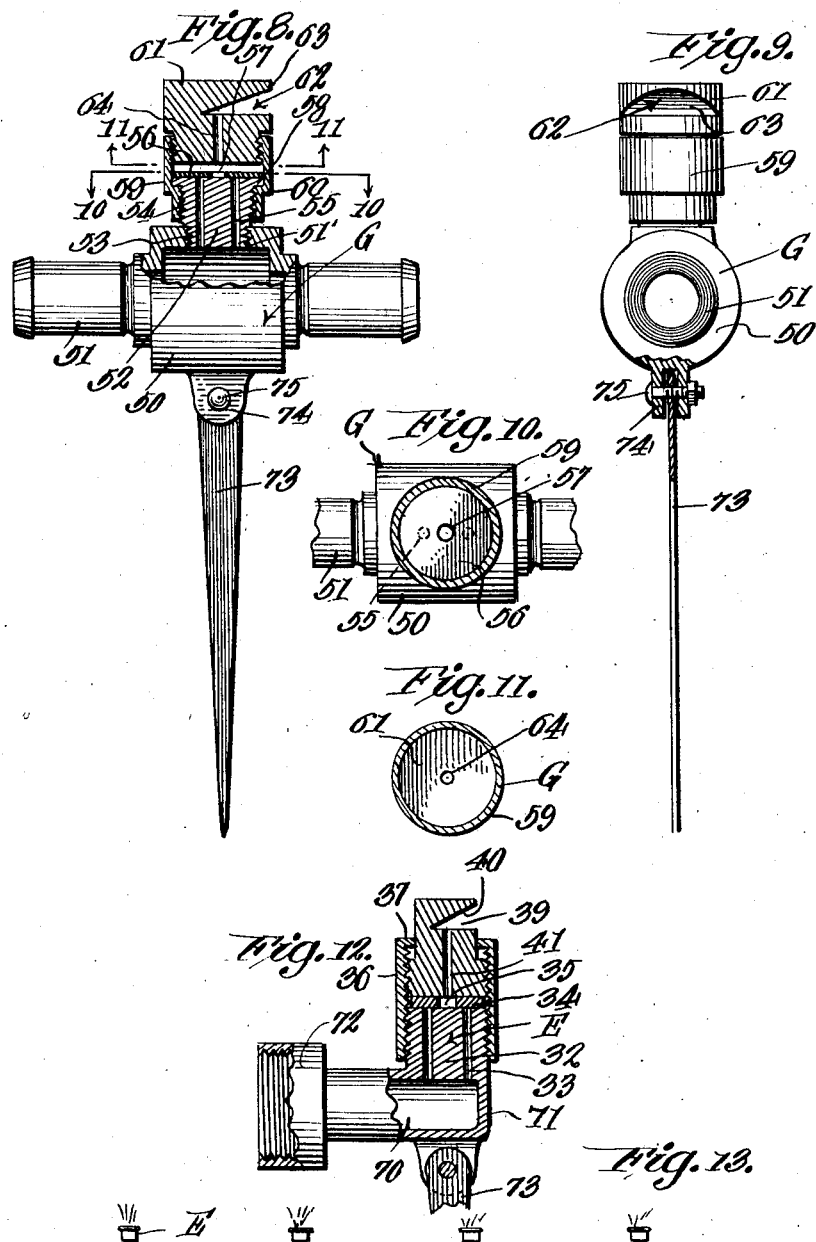
INVENTOR.
ARLINGTON P. GREEN
BY
ATTORNEYS.

Patented Nov. 10, 1931

1,830,833

UNITED STATES PATENT OFFICE

ARLINGTON P. GREEN, OF LOS ANGELES, CALIFORNIA

LAWN SPRINKLER

Application filed February 4, 1929. Serial No. 337,407.

This invention relates to water distribution and more particularly to novel means for watering lawns, gardens, etc.

One of the primary objects of the invention is to provide a lawn sprinkler, which can be connected with a hose or pipe at spaced points throughout the length thereof, whereby a lawn or a garden or relatively great area can be effectively watered in one operation.

Another salient object of my invention is the provision of a lawn sprinkler embodying a plurality of sprinkling members, which members can either be incorporated with a hose or a pipe at spaced points throughout the length thereof and either used upon the surface of the ground or buried in the ground leaving the sprinkling members exposed only to view.

A further important object of my invention is the provision of a lawn sprinkler embodying a plurality of sprinkling members, which can be placed at spaced points throughout a hose or a pipe, embodying novel means for controlling the flow of water therethrough, said means also acting as shut-off valves or closures, so as to prevent the entrance of dirt, bugs, or the like into the same when said members are not in use.

A further object of the invention is the provision of novel supporting legs or spikes for the sprinkling members, whereby said members can be held at the desired angle relative to the ground to be watered.

A further object of the invention is the provision of novel sprinkling members so constructed to deliver a circular spray of water around the same or a side spray of water at one side thereof.

A still further object of the invention is to provide an improved lawn sprinkler of the above character which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed, and illustrated in the accompanying drawings, in which drawings:—

Figure 1 is a side elevation of one of my novel sprinkling members showing the same incorporated within the length of a hose, parts of the sprinkler being shown broken away and in vertical section.

Figure 2 is a horizontal section taken on the line 2—2 of Figure 1 looking in the direction of the arrows.

Figure 3 is a horizontal section taken on the line 3—3 of Figure 1 looking in the direction of the arrows.

Figure 4 is a top plan view of one of the sprinkling members.

Figure 5 is a side elevation of one of my sprinkling members of the side spray device, parts thereof being broken away and in vertical section.

Figure 6 is a horizontal section taken on the line 6—6 of Figure 5 looking in the direction of the arrows.

Figure 7 is a horizontal section taken on the line 7—7 of Figure 5 looking in the direction of the arrows.

Figure 8 is a side elevation of one of my sprinkling members of the side spray type showing a modified form thereof, parts thereof being shown broken away and in section.

Figure 9 is an end elevation of the same, a part thereof being shown broken away and in section to illustrate the point of connection of the ground engaging spike with the body of the sprinkling member.

Figure 10 is a horizontal section taken on the line 10—10 of Figure 8 looking in the direction of the arrows.

Figure 11 is a horizontal section taken on the line 11—11 of Figure 8 looking in the direction of the arrows.

Figure 12 is a side elevation of one of the end spray members with parts thereof broken away and in vertical section, and Figure 13 is a diagrammatical view illustrating certain of my sprinkling members incorporated with a pipe.

Referring to the drawings in detail, wherein similar reference characters designate corresponding parts throughout the several views, the letter A generally indicates one of my novel sprinkling members, and B and C hose sections with which the same can be associated.

As clearly shown in Figure 13 of the drawings a plurality of my sprinkling members A can be placed at equi-distantly spaced points within the length of a hose or pipe D (as shown in said figure) and the end of the pipe can have attached thereto one of my sprinkling members generally indicated by the reference character E.

The lawn sprinkler member A comprises a central hollow body portion 10 having formed integral therewith the oppositely extending hose nipples 11. The nipples 11 receive hose sections B and C which are forced over the same and these nipples can be constructed in any preferred way and the hose sections can be held thereon in any desired way.

As shown, the inner ends of the nipples can each be provided with an annular shoulder 12 for receiving a clamping ring 13. This clamping ring 13 can be provided with a plurality of gripping members 14 for grasping the hose sections.

The upper end of the body 10 is provided with a cylindrical extension or threaded boss 15 having a plurality of water passageways 16 formed therein around the axial center thereof. These water passageways communicate with the interior of the body 10 and open out through the upper end of the boss.

The axial center of the boss is provided with a threaded opening 17, for a purpose, which will be later described.

Threaded upon the boss is the water outlet head or nozzle 18, which at a point intermediate its ends is increased in thickness to provide an interior seat 19 for overlying a portion of the outer end of the boss. The interior of the water outlet head or nozzle 18 is flared outwardly as at 20 to provide a substantial conical shaped water exit and the lower narrow portion of the exit communicates with the interior of the water outlet head or nozzle.

Interposed between the seat 19 and the outer end of the boss 15 is a suitable annular gasket or washer 21 which normally overlies the water passageways 16. The bore of the washer or gasket communicates with the axial center of the flared outlet of the water head.

Threaded into the opening 17 is a threaded stem 22, the upper end of which is provided with an inverted conical shaped head 23 which conforms to the configuration of the flared outlet. It is to be noted however, that the conical head 23 is normally spaced from the wall of the flared outlet and this head acts in the nature of means for spreading the water outward on all sides of the nozzle as the same flows into the same.

The conical shaped head 23 can be provided with a diametrically extending slot 24, whereby the head can be conveniently adjusted by means of a screw driver relative to the flared outlet.

In use of the improved sprinkling member the stem 22 is adjusted to the desired position initially, after which the head or nozzle 18 is rotated so as to permit the force of the water to unseat the gasket or washer 21 and the water will flow upward through the passageways 16 underneath the gasket 21 through the axial bore in the gasket and out through the flared tip of the nozzle and the water will be thrown outward in a circular path.

As stated, the members A can be incorporated at different points in the length of a hose and the end of the hose can receive one of the end sprays E.

In Figures 5 to 7 inclusive I have illustrated one form of my novel side spray, which is generally indicated by the reference character F. This member also includes a central body portion 30 having the laterally extending hose receiving nipples 31 and the upper end of the body is provided with the upwardly extending threaded boss 32, which is provided with the water passageways 33 arranged on opposite sides of the diametric center of the boss. The upper end of the boss receives the gasket or washer 34 provided with an axial bore or opening 35. The boss has threaded thereon an interiorly threaded sleeve 36, the upper end of which is provided with an annular guard or stop shoulder 37. The sleeve receives the water outlet head 38, which head is provided with an enlarged cylindrical base exteriorly threaded for engaging the interior threads of the sleeve 36. The smaller portion of the head normally projects through the outer end of the sleeve and is received by the flange 37 which acts as a stop shoulder for the base portion of said head.

In assembling the member, the nozzle is first threaded into the sleeve, after which the sleeve is threaded on the boss 32 with the washer 34 confined between the boss and head.

In accordance with this invention one side of the head beyond the base is provided with an inwardly directed kerf or slot 39 having the upwardly and outwardly inclined top wall 40 against which the water is adapted to initially impinge, as will be later described. It is to be noted that the nozzle or water outlet is provided with an axial water passageway 41 which opens out through the lower end of the nozzle and into the slot or kerf 39. This passageway 41 registers or aligns with the axial opening 35 in the washer 34.

In use of the side spray when it is desired to cut off the flow of water, the nozzle is threaded downwardly into the sleeve which seats the washer on the top of the boss and closes the water passageway 33. When it is desired to use the spray, the nozzle is threaded upwardly in the sleeve which will allow the pressure of the water to unseat the gasket and thus permit the flow of water through the passageway 33 under the gasket 34 through the opening 35 in the gasket, through the passageway 41 and into the slot or kerf 39. The water in striking against the inclined wall 40 will be directed outwardly at one side of the member.

As shown, the side spray is used in one of the members F which can be placed intermediate the length of a hose or pipe but it is to be also understood that the side spray can be effectively used at one end of a pipe or hose.

In Figures 8 to 11 inclusive I have shown a further modified form of my side spray which is generally indicated by the reference character G.

The member G also embodies a cylindrical central body portion 50 having the oppositely extending hose receiving nipples 51. In this form of my invention, the upper end of the body 50 is provided with a central opening 51' and the wall of this opening is provided with threads for the reception of a head 52. The head 52 includes a reduced lower end portion 53 which is threaded into the opening 51' and an enlarged portion 54 which is also exteriorly threaded. This head 52 is provided with longitudinally extending water passageways 55 on the opposite side of the axial center thereof and the head has normally seated thereon a gasket 56 provided with a central opening 57. The extreme upper end of the head 52 is provided with an outwardly directed annular stop flange 58.

The head receives a sleeve 59 which is reduced intermediate its ends forming an annular stop shoulder 60 for engaging the annular stop flange 58. The smaller end of the sleeve is internally threaded for engaging the threads on the head and the enlarged portion of the sleeve is likewise interiorly threaded for the reception of the water outlet nozzle 61. This nozzle has its lower end reduced in diameter for fitting into the sleeve and the upper end thereof is provided with an inwardly directed side kerf or slot 62 having the outwardly and upwardly flared top wall 63 against which the water is adapted to impinge.

As shown, the outlet nozzle is provided with an axial passageway 64, which opens out through the lower end of the nozzle and into the slot 62 adjacent to the inner end thereof.

In assembling this nozzle, the head 62 is first threaded into the sleeve 59 after which the head is threaded into the opening 51 formed in the body 50. The gasket 56 can now be placed on the upper surface of the head and the nozzle 61 can be threaded into position.

In use of this form of side spray, when it is desired to cut-off the flow of water therethrough, the nozzle is turned so as to feed the same into engagement with the washer so as to hold the washer on its seat for closing the passageways 55.

When it is desired to use the side spray, the nozzle is threaded outwardly of the sleeve and the water pressure acting against the gasket or washer will unseat the same, which will allow the water to flow through the passageways 55, underneath the washer, through the opening 57 in the washer, through the passageway 64 and out of the slot 62. The water impinging against the inclined face 63 will be directed outwardly in the form of a spray at one side of the nozzle.

Referring more particularly to the form of my spray indicated by the reference character E, which is used at the end of a hose or pipe, it can be seen that the same includes a cylindrical hollow body 70 closed at one end by a wall 71 and having formed on its opposite end a female coupling 72 for connection with a hose coupling.

The member E has been shown of the side spray type and of the same construction as the side spray F previously described.

Figure 13 illustrates a plurality of spray members incorporated in the length of the pipe D and the end of the pipe is provided with one of the side sprays E.

I prefer to provide all of the different types of my spray members with means for supporting the same in upright position on the ground, with the exception of the form shown in Figure 13 which can be buried in the ground with the nozzles only exposed to view. The means for supporting the spray members in an upright position on the ground includes sharpened ground penetrating spikes 73, the upper ends of which can be received between the pivot ears 74 formed on the bodies of the spray members. A suitable pivot bolt 75 can be extended through the ears 74 and the upper end of the ground penetrating device.

From the foregoing description, it can be seen that I have provided novel sprinkling members which can be used in a novel fashion for permitting the convenient and expeditious watering of a lawn over a relatively wide area.

Changes in details may be made without departing from the spirit or the scope of the invention, but—

What I claim as new is:

1. A hose sprinkling member comprising a hollow body, a hose receiving connection formed on said body, an extension carried by the upper end of the body provided with longitudinally extending passageways on each side of the axial center thereof communicating with the interior of the body, a valve disc having an axial opening normally arranged upon the extension to close said passageways, and a nozzle adjustable toward and away from said disc, the pressure of the water acting on the disc for unseating the same.

2. A sprinkling member comprising a hollow body, a laterally extending hose connection carried by the body, a boss formed on the body having longitudinally extending passageways therethrough on each side of the axial center, a valve disc adapted to normally seat on the boss for closing the passageways having an axial opening, a flared water outlet adjustable toward and away from the gasket for holding the same on the boss over the passageways, and a conical inverted plug carried by the boss arranged in said flared outlet, the pressure of the water acting on the valve disc to normally move the same away from the boss and above the passageways.

3. A sprinkling member comprising a hollow body, a laterally extending hose connection carried by the body, a boss formed on the body having longitudinally extending passageways therethrough on each side of the axial center, a valve disc adapted to normally seat on the boss for closing the pasageways having an axial opening, the boss being provided with an axially internally threaded socket registering with the axial opening of the valve disc, a flared water outlet adjustable toward and away from the valve disc for holding the same on the boss over the passageways, a stem extending through the axial opening in the valve disc and threaded into the socket, and a conical inverted plug carried by the stem arranged in said flared outlet, the pressure of the water acting on the valve disc to normally move the same away from the boss and above the passageways.

In testimony whereof I affix my signature.

ARLINGTON P. GREEN.